United States Patent
Grzesiak et al.

(10) Patent No.: US 10,662,370 B2
(45) Date of Patent: May 26, 2020

(54) NONIONIC SURFACTANT COMPOSITIONS FOR ENHANCED OIL RECOVERY

(71) Applicant: Dow Global Technologies LLC, Midland, MI (US)

(72) Inventors: Adam L. Grzesiak, Midland, MI (US); Robert M. Campbell, Midland, MI (US); Jacob M. Crosthwaite, Midland, MI (US); Amit Katiyar, Sugar Land, TX (US); Troy E. Knight, Missouri City, TX (US); Pramod D. Patil, Sugar Land, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 16/333,841

(22) PCT Filed: Oct. 4, 2017

(86) PCT No.: PCT/US2017/055014
§ 371 (c)(1),
(2) Date: Mar. 15, 2019

(87) PCT Pub. No.: WO2018/075237
PCT Pub. Date: Apr. 26, 2018

(65) Prior Publication Data
US 2019/0256763 A1    Aug. 22, 2019

Related U.S. Application Data

(60) Provisional application No. 62/409,657, filed on Oct. 18, 2016.

(51) Int. Cl.
*C09K 8/584* (2006.01)
*C09K 8/594* (2006.01)
*E21B 43/16* (2006.01)
*E21B 43/22* (2006.01)

(52) U.S. Cl.
CPC .............. *C09K 8/584* (2013.01); *C09K 8/594* (2013.01); *E21B 43/164* (2013.01)

(58) Field of Classification Search
CPC .......... C09K 8/584; C09K 8/594; C09K 8/94; C09K 8/703; C09K 8/38; C09K 8/518; C09K 8/604; C09K 8/602; E21B 43/16; E21B 43/164; E21B 43/26
See application file for complete search history.

(56) References Cited

U.S. PATENT DOCUMENTS

| 4,380,266 A | 4/1983 | Wellington |
| 2005/0014979 A1 | 1/2005 | Eleveld et al. |
| 2005/0170991 A1 | 8/2005 | Ruland et al. |
| 2011/0083846 A1 | 4/2011 | Bittner et al. |
| 2013/0068312 A1* | 3/2013 | Sanders ............... B01F 5/0463 137/1 |
| 2015/0136397 A1* | 5/2015 | Abbas ................... C09K 8/584 166/300 |
| 2016/0237798 A1 | 8/2016 | Sanders et al. |
| 2017/0015894 A1* | 1/2017 | Bittner .................. C09K 8/584 |

FOREIGN PATENT DOCUMENTS

WO    2015135851    9/2015

OTHER PUBLICATIONS

Chen, Yunshen, et. al., "CO2-in-Water Foam at Elevated Temperature and Salinity Stabilized with a Nonionic Surfactant with a High Degree of Ethoxylation," Industrial & Engineering Chemistry Research, 2015, p. 4252-4263, v. 54, ACS Publications.
Nguyen, Quoc P., et. al., "Effect of Surfactant Partitioning on Mobility Control During CO2 Flooding," 2013, SPE Journal, p. 752-765, University of Texas at Austin.
Chen, Xi, et. al., "Interfacial tension and the behavior of microemulsions and macroemulsions of water and carbon dioxide with a branched hydrocarbon nonionic surfactant," Journal of Supercritical Fluids, 2010, p. 712-723, v. 55, Elsevier.
Adkins, Stephanie S., et. al., "Morphology and Stability of CO2-in-Water Foams with Nonionic Hydrocarbon Surfactants," 2010, Langmuir, p. 5335-5348, v. 26, No. 8.

* cited by examiner

*Primary Examiner* — Zakiya W Bates

(57) ABSTRACT

The present invention provides for a method of using a mixture of two or more nonionic surfactants for enhanced oil recovery and for an emulsion that includes carbon dioxide, a diluent and a mixture of two or more nonionic surfactants, where each nonionic surfactant is prepared with a double metal cyanide catalyst.

6 Claims, No Drawings

NONIONIC SURFACTANT COMPOSITIONS FOR ENHANCED OIL RECOVERY

FIELD OF THE INVENTION

Embodiments of the present invention are directed towards surfactants; more specifically, embodiments are directed towards a mixture of nonionic surfactants that are soluble in carbon dioxide for enhanced crude oil recovery.

BACKGROUND OF THE INVENTION

A variety of techniques have been used to enhance the recovery of hydrocarbons from subterranean formations in which the hydrocarbons no longer flow by natural forces. Such techniques can include water injection and/or subsequent miscible carbon dioxide flooding, among others. Water injection can be useful to recover some hydrocarbons, however, only about a third of the hydrocarbons are recovered using this technique. As such, typically water injection procedures are followed by an enhanced oil recovery technique such as miscible gas flooding. Miscible gas flooding can be performed with carbon dioxide, to reduce the viscosity of the crude oil present in the subterranean formation in order to increase the flow of hydrocarbons to a production well; carbon dioxide is one of the most effective, and least expensive, miscible gases. During the miscible carbon dioxide flooding procedure the carbon dioxide is typically in the liquid and/or supercritical phase.

Miscible carbon dioxide flooding, however, can be accompanied with a number of drawbacks. One main problem encountered is poor sweep of the subterranean formation. Poor sweep occurs when the gas injected into the reservoir during a miscible carbon dioxide flooding process flows through the paths of least resistance due to the low viscosity of the gas, thus bypassing significant portions of the formation. When the gas bypasses significant portions of the formation, less crude oil is contacted with the gas, reducing the likelihood that the gas will reduce the viscosity of the crude oil. Thus, the gas injected during the miscible carbon dioxide flooding process is meant to "sweep" the crude oil toward the production well by lowering the viscosity of the crude oil. However, when the gas does not contact a large portion of the crude oil contained in the subterranean formation, a large portion of the crude oil in the subterranean formation is left behind, producing poor sweep. In addition, due to the low density of the gas, the injected gas can rise to the top of the formation and "override" portions of the formation, leading to early breakthrough of the gas at the production well, leaving less gas within the subterranean formation to contact with the crude oil, again reducing the likelihood that the gas will reduce the viscosity of the crude oil.

To enhance the effectiveness of the miscible carbon dioxide flooding process it has been suggested that a foaming agent or a surfactant be included in the process to help to generate a foam in the formation. A foam can generate an apparent viscosity of 100 to 1,000 times that of the injected gas, therefore, the foam can inhibit the flow of the gas into that portion of the subterranean formation that has previously been swept. In other words, the foam can serve to block the volumes of the subterranean formation through which the gas can short-cut, thereby reducing its tendency to channel through highly permeable fissures, cracks, or strata, and directing it toward previously unswept portions of the subterranean formation. As such, the foam can force the gas to drive the recoverable hydrocarbons from the less depleted portions of the reservoir toward the production well.

The surfactants used in creating foams for miscible carbon dioxide flooding processes, however, have suffered from a number of drawbacks. For example, traditional surfactants, such as ethoxy-sulfates, can create emulsions of oil and water which are difficult to break. The emulsions can cause permanent damage to the formation by irreversibly plugging pore throats. Further, these emulsions when produced may be difficult to separate or "break" and may necessitate costly solutions to remedy. Another problem encountered by prior art surfactants has been the selection of anionic surfactants that have a high affinity to formation rock within the reservoir, for example, carbonate. Surfactants with a high affinity to formation rock can adsorb into the formation rock, leading to surfactant loss. Without the surfactant present, there is less likelihood of forming foam within the reservoir, also leading to early breakthrough and poor sweep, as discussed herein.

SUMMARY OF THE INVENTION

Embodiments of the present invention include a mixture of two or more nonionic surfactants, a method of forming the nonionic surfactants and a method for recovering crude oil from a subterranean formation with the mixture of two or more nonionic surfactants of the present invention.

The present invention provides for, among other things, a method for recovering crude oil from a subterranean formation that is penetrated by at least one injection well and one production well, that includes injecting a mixture of two or more nonionic surfactants in carbon dioxide into the subterranean formation, where each nonionic surfactant is independently prepared by an alkoxylation reaction of a first epoxide, a second epoxide, and optionally a third epoxide where the first, second, and third epoxides are different from one another, and a linear or branched aliphatic alcohol having 1 to 20 carbon atoms said alkylation reactions being performed using a base, such as KOH, a double metal cyanide catalyst, or mixtures thereof; and recovering crude oil from the subterranean formation from a production well. Injecting the mixture of two or more nonionic surfactants can include creating a foam with the nonionic surfactant in carbon dioxide and a diluent; and injecting the foam of the mixture of two or more nonionic surfactant in carbon dioxide and the diluent into the subterranean formation.

In one embodiment of the method disclosed herein above, the mixture of nonionic surfactants comprises: (A) a first nonionic surfactant which is a block copolymer reaction product of an alphatic alcohol, $R_1OH$, with propylene oxide (PO), ethylene oxide (EO), and optionally butylene oxide (BO) represented by the following formula:

$$R_1\text{—O—}BO_x\text{—}PO_y\text{-}EO_z \qquad \text{I}$$

wherein $R_1$ is a linear or branched $C_1$ to $C_{20}$ alkyl group; x is 0 to 5; y is 0 to 10; and z is 0 to 25; wherein the alphatic alcohol $R_1OH$ may be reacted with PO, EO, and optionally BO in any order and (B) a second nonionic surfactant which is a block copolymer reaction product of an alphatic alcohol, $R_2OH$ with propylene oxide (PO), ethylene oxide (EO), and optionally butylene oxide (BO) represented by the following formula:

$$R_2\text{—O—}BO_l\text{—}PO_m\text{-}EO_n \qquad \text{II}$$

wherein $R_2$ may be the same or different than $R_1$ and is a linear or branched $C_1$ to $C_{20}$ alkyl group; l is 0 to 5; m is 0 to 10 and n is equal to or greater than z+4 and equal to or less than 50, wherein the alphatic alcohol $R_2OH$ may be reacted with PO, EO, and optionally BO in any order.

In one embodiment of the method disclosed herein above, each nonionic surfactant can have a polydispersity of 1.01 to 1.10.

In one embodiment of the method disclosed herein above, for each of the nonionic surfactants the linear or branched aliphatic alcohol can have 6 to 9 carbon atoms.

In one embodiment of the method disclosed herein above, for each of the nonionic surfactants the first epoxide can be selected from the group consisting of propylene oxide, butylene oxide, hexene oxide, octene oxide, and combinations thereof; and/or the second epoxide can be ethylene oxide.

In one embodiment of the method disclosed herein above, for each of the nonionic surfactants, the first epoxide is propylene oxide and the second epoxide is ethylene oxide, and a first stage of the alkoxylation reaction adds the propylene oxide to the linear or branched aliphatic alcohol and a second stage of the alkoxylation reaction adds the ethylene oxide to provide the nonionic surfactant.

In one embodiment of the method disclosed herein above, each nonionic surfactant can have propylene oxide as the first epoxide, where the alkoxylation reaction can have a molar ratio in a range of 1.5 to 10 moles of propylene oxide per mole of linear or branched aliphatic alcohol. Each of the nonionic surfactants in the mixture of the present invention can have ethylene oxide as the second epoxide, where the alkoxylation reaction has a molar ratio in a range of 1 to 25 moles of ethylene oxide per mole of linear or branched aliphatic alcohol.

In one embodiment of the present invention, the mixture of nonionic surfactants can be used as part of a foam for use in enhanced crude oil recovery. An example of such a foam includes the mixture of the nonionic surfactants, carbon dioxide in a liquid or supercritical phase, and a diluent, where the mixture of nonionic surfactants promotes a formation of the foam formed of carbon dioxide and the diluent.

The above summary of the present invention is not intended to describe each disclosed embodiment or every implementation of the present invention. The description that follows more particularly exemplifies illustrative embodiments. In several places throughout the application, guidance is provided through lists of examples, and which examples can be used in various combinations. In each instance, the recited list serves only as a representative group and should not be interpreted as an exclusive list.

DETAILED DESCRIPTION OF THE INVENTION

As used herein, "a," "an," "the," "at least one," and "one or more" are used interchangeably. The terms "comprises," "includes" and variations of these words do not have a limiting meaning where these terms appear in the description and claims. Thus, for example, a foam that comprises "a" nonionic surfactant can be interpreted to mean a foam that includes "one or more" nonionic surfactants. In addition, the term "comprising," which is synonymous with "including" or "containing," is inclusive, open-ended, and does not exclude additional unrecited elements or method steps.

As used herein, the term "and/or" means one, more than one, or all of the listed elements.

Also herein, the recitations of numerical ranges by endpoints include all numbers subsumed within that range (e.g., 1 to 5 includes 1, 1.5, 2, 2.75, 3, 3.80, 4, 5, etc.).

As used herein, the term "diluent" can include, for example, water, brine, connate water, surface water, distilled water, carbonated water, sea water and combinations thereof. For brevity, the word "diluent" will be used herein, where it is understood that one or more of "water," "brine," "connate water," "surface water," "distilled water," "carbonated water," and/or "sea water" can be used interchangeably.

As used herein, a "surfactant" refers to a chemical compound that lowers the interfacial tension between two liquids.

As used herein, a "dispersion" refers to a system in which particles of any nature (e.g. solid, liquid or gas) are dispersed in a continuous phase of a different composition (or state). Examples of a dispersion can include an emulsion and a foam.

As used herein, an "emulsion" refers to a mixture of two immiscible liquids, where one liquid (the dispersed phase) is dispersed in the other (the continuous phase).

As used herein, a "foam" refers to a dispersion of a gas, liquid, or supercritical fluid (where the phase may change depending on the conditions in the process) in a liquid.

As used herein, a "nonionic surfactant" refers to a surfactant where the molecules forming the surfactant are uncharged.

As used herein, "crude oil" refers to a naturally occurring, inflammable liquid consisting of a complex mixture of hydrocarbons of various molecular weights and other liquid organic compounds that are found in subterranean formations beneath the Earth's surface.

As used herein, a "supercritical phase" means a dense gas that is maintained above its critical temperature (the temperature above which it cannot be liquefied by pressure).

As used herein, a "cloud point" of a solution that includes the nonionic surfactant of the present invention is the temperature at which the nonionic surfactant is no longer completely soluble, precipitating as a second phase giving the solution a cloudy appearance.

Embodiments of the present invention include one or more nonionic surfactants for enhanced crude oil recovery, the nonionic surfactant being prepared by alkoxylation reactions with a double metal cyanide catalyst of a first epoxide, preferably ethylene oxide (EO), a second epoxide different than the first epoxide, preferably propylene oxide (PO), optionally a third epoxide different from the first and second epoxides, preferably butylene oxide (BO), and a linear or branched aliphatic alcohol having 6 to 9 carbon atoms.

The nonionic surfactant can be used as part of a foam for enhanced crude oil recovery. The foam can include the nonionic surfactant, carbon dioxide ($CO_2$) in a liquid or supercritical phase, and a diluent, where the nonionic surfactant promotes a formation of the foam of the carbon dioxide, the diluent and the nonionic surfactant.

Carbon dioxide is a poor solvent and, in general, only expensive nonionic surfactants containing such elements as fluorine and/or silicon are soluble in it. Unlike these expensive nonionic surfactants, the nonionic surfactants of the present invention are formed with a base or a double metal cyanide (DMC) catalyst that allows for nonionic surfactants that are soluble in carbon dioxide at temperatures and pressure that are typically found in subterranean formations undergoing enhanced crude oil recovery. Examples of such temperatures and pressures for subterranean formations include temperatures of 40 to 110° C. and pressures of 8300 (1200 pounds per square inch (psi)) to 55000 (8000 psi)

KPa. Surprisingly, the nonionic surfactants used in the present invention can remain soluble in carbon dioxide at these lower pressures (e.g., 8300 kPa), which allows for their use in shallower subterranean formations. In addition, the improved carbon dioxide solubility of the nonionic surfactants used in the present invention allows the nonionic surfactants to remain in the carbon dioxide phase longer, thereby allowing the nonionic surfactants to travel deeper into the subterranean formation.

For the various embodiments, carbon dioxide used in enhanced crude oil recovery can be in a liquid, a gas or supercritical phase. As appreciated by one skilled in the art, carbon dioxide is in a liquid phase when subjected to a pressure of 1,072 pounds per square inch (psi) and a temperature below 31 degrees Celsius (° C.). In addition, the carbon dioxide can transition to a supercritical phase when, at a pressure of 1,072 psi, the temperature rises above 31° C. In embodiments of the present invention, the carbon dioxide injected into the subterranean formation can be transferred through a pipeline where the pressure is 1400 psi to 2000 psi and temperature ranges from 25 to 70° C.

So, it is appreciated that the carbon dioxide used in enhanced crude oil recovery processes may vacillate between one or more of a liquid phase or a supercritical phase. As such, the nonionic surfactant, the diluent and the carbon dioxide form what can broadly be called a dispersion, which can encompass both a foam and/or an emulsion. For ease of reading, the term "foam" will be used in the present invention for consistency, but it is understood that at various points during its use the carbon dioxide can be in different phases (e.g., liquid, gas, supercritical), therefore, the exact form of the dispersion formed with the nonionic surfactant, the diluent and the carbon dioxide could be as a foam or could be as an emulsion or something in between.

As discussed herein, an issue in enhanced crude oil recovery is that carbon dioxide injected directly into an underground formation has a low viscosity, as a result of which it channels through high permeability zones in an oil reservoir and leaves much of the oil behind. So, instead of spreading out through the underground formation, the carbon dioxide finds the fastest way through the formation. If, however, the carbon dioxide were made to behave in a more viscous manner, it could be made to spread out and slow down thereby contacting more of the underground formation. This would lead to more contact of the carbon dioxide with the crude oil in the underground formation.

To address this problem, the nonionic surfactant of the present invention helps to form a foam of carbon dioxide and the diluent. The structure of the nonionic surfactants helps to lower the interfacial tension between the carbon dioxide and the diluent, which helps in creating the foam. When formed in the underground formation, the foam helps to increase the residence time of the carbon dioxide and to spread the carbon dioxide through the underground formation. Once in contact with the crude oil, the carbon dioxide can absorb into the crude oil making it less viscous, among other desirable properties.

For creating foams for conformance and mobility control in enhanced oil recovery operations, it has been determined that it is preferable in some instances to inject the surfactant dissolved in the carbon dioxide. The nonionic surfactants of the present invention display a solubility in carbon dioxide at the temperatures and pressures typically found in subterranean formations undergoing enhanced crude oil recovery.

The nonionic surfactants of the present invention are prepared by an alkoxylation reaction with a first epoxide, a second epoxide different than the first epoxide, optionally a third epoxide different than the first epoxide and the second epoxide, and an alcohol having 1 to 20, preferably a linear or branched aliphatic having 6 to 9 carbon atoms using a base such as KOH, a DMC catalyst, or mixtures thereof. As discussed herein, embodiments of the present invention utilize an aliphatic linear or branched alcohol. Preferably for aliphatic linear or branched alcohols, they are acyclic and a monohydric alcohol. Preferably, the aliphatic branched alcohol has 6 to 9 carbon atoms. Using a mixture of the aliphatic branched alcohols to create the nonionic surfactants of the present invention is also possible. The choice of the number of carbon atoms used in the branched structure can be selected based on the end use of the foam, especially the temperature, brine content, and/or pressure of the subterranean formation in which the foam will be used.

Alkoxylating alcohols with a first and second epoxide is known, for example see U.S. Pat. No. 9,340,724, which is incorporated herein by reference in its entirety. For the various embodiments of the present invention, providing each nonionic surfactant can include an alkoxylation reaction having a first stage, a second stage, and optionally a third stage. The first stage includes alkoxylating the alcohol of the aliphatic linear or branched alcohol with the first epoxide to provide an intermediate compound. The second stage includes alkoxylating the intermediate compound with the second epoxide, different than the first epoxide, to form a nonionic surfactant or a second intermediate compound if further alkoxylation is desired. The third stage, if present, includes alkoxylating the second intermediate compound with a third epoxide, different than the first and second epoxides, to form the nonionic surfactant.

So, for example, in the first stage of the alkoxylation reaction a first epoxide can be added to the alcohol of the aliphatic branched alcohol in a blockwise fashion (as compared to a random fashion), followed by a blockwise addition of a second epoxide, and optionally followed by a blockwise addition of a third epoxide. In other words, alkoxylating the alcohol of the aliphatic linear or branched alcohol with the first epoxide forms a first homopolymer subunit (e.g., a first block) covalently attached to the aliphatic branched alcohol. This intermediate compound can then be alkoxylated with the second epoxide (a different epoxide structure than the first epoxide) to form a second homopolymer subunit (e.g., a second block) on the intermediate compound thereby forming the nonionic surfactant of the present invention or a second intermediate compound that can then be alkoxylated with the third epoxide (having a different structure than either the first or second epoxide) to form a third homopolymer subunit (e.g., a third block) on the second intermediate compound thereby forming the nonionic surfactant of the present invention.

The alkoxylation reactions independently use a base, such as KOH, or preferably a DMC catalyst in both the first stage, the second stage, and optional third stage of the alkoxylation reaction to produce the nonionic surfactants used in the present invention. A variety of bases and/or DMC catalysts can be used in the alkoxylation reactions. For example, suitable DMC catalysts can be prepared by reacting aqueous solutions of metal salts and metal cyanide salts or metal cyanide complex acids to form the DMC catalyst as a precipitate.

Examples of suitable DMC catalysts for the alkoxylation reaction of the present invention can be found, for example, in US Patent Publications 2011/0083846 and 2005/0170991, among others, which are both incorporated herein by reference. Specific examples of suitable DMC catalysts include, but are not limited to, ARCOL Catalyst 3, a DMC catalyst available from Bayer Material Science AG (Leverkusen, DE). For carrying out the reaction, the DMC catalyst can be added to the branched alcohol. By means of reduced pressure (for example <100 mbar) and/or by increasing the temperature (30 to 150° C.), water still present in the mixture can be removed. Thereafter, inert conditions are established with inert gas (e.g. nitrogen) and the first epoxide and then the second epoxide are added in stages, as discussed herein, at temperatures of from 60 to 180° C. Usually, 250 ppm to 1000 ppm of catalyst, based on the mixture, is used for the alkoxylation reaction. Reaction times for each step of the alkoxylation reaction can depend upon the degree of alkoxylation desired as well as upon the rate of the alkoxylation reaction (which is, in turn, dependent upon temperature, pressure, catalyst quantity and nature of the reactants).

In the first stage of the alkoxylation reaction, the aliphatic linear or branched alcohol and the DMC catalyst are introduced into a reactor system and reacted under inert conditions (e.g., a nitrogen atmosphere). The alcohol on the aliphatic linear or branched alcohol reacts with the first epoxide to form an intermediate compound. The second epoxide is added to the reactor system during the second stage of the alkoxylation reaction, where the second epoxide, different than the first epoxide, reacts with the intermediate compound in the presence of the catalyst and under the inert conditions to form the nonionic surfactant or a second intermediate compound. Optionally, the third epoxide is added to the reactor system during the third stage of the alkoxylation reaction, where the third epoxide, different than the first epoxide, reacts with the second intermediate compound in the presence of the catalyst and under the inert conditions to form the nonionic surfactant. The same catalyst can be present in each of the alkoxylation reactions. If desired, additional catalyst can be added during the alkoxylation reaction.

For the present invention, the first epoxide is selected from the group consisting of propylene oxide, butylene oxide, hexene oxide, octene oxide, preferably propylene oxide. The second epoxide can be ethylene oxide. If used, the third the first epoxide is selected from the group consisting of propylene oxide, butylene oxide, hexene oxide, octene oxide, such that it a different epoxide that the first epoxide. As discussed, the second epoxide is different than the first epoxide and the third epoxide is different than both the first and second epoxide in forming the nonionic surfactant of the present invention. So, for example, when the first epoxide is propylene oxide, the second and third epoxides cannot also be propylene oxide.

In a preferred embodiment, the first epoxide is propylene oxide and the second epoxide is ethylene oxide and there is not a third epoxide. For this embodiment, the first stage of the alkoxylation reaction adds the propylene oxide to the branched aliphatic alcohol and the second stage of the alkoxylation reaction adds the ethylene oxide to provide the nonionic surfactant. For example, during the first stage when the first epoxide is propylene oxide the alkoxylation reaction can have a molar ratio in a range of 1.5 to 10 moles of propylene oxide per mole of branched aliphatic alcohol. Preferably, during the first stage when the first epoxide is propylene oxide the alkoxylation reaction can have a molar ratio of propylene oxide to the branched aliphatic alcohol in a range of 3:1.0 moles to 7:1.0 moles. During the second stage when the second epoxide is ethylene oxide the alkoxylation reaction has a molar ratio in a range of 1.5 to 25 moles of ethylene oxide per mole of branched aliphatic alcohol. Preferably, during the second stage when the second epoxide is ethylene oxide the alkoxylation reaction has a molar ratio in a range of 7 to 16 moles of ethylene oxide per mole of branched aliphatic alcohol. Specific examples of this second stage of the alkoxylation reaction include using a molar ratio of ethylene oxide to branched aliphatic alcohol of 9:1 moles or using a molar ratio of ethylene oxide to branched aliphatic alcohol of 14:1 moles.

The nonionic surfactants of the present invention provide a water soluble component and a carbon dioxide soluble (water insoluble) component. While not wishing to be bound by theory, it is believed that the propylene oxide used in forming the nonionic surfactants, along with the linear or branched aliphatic alcohol, provides the carbon dioxide soluble (water insoluble) component of the nonionic surfactant, while the ethylene oxide used in forming the nonionic surfactant provides the water soluble component of the nonionic surfactant. To modify the carbon dioxide and/or the water soluble portions, changes in the molar amount of the propylene oxide and ethylene oxide used in the nonionic surfactant and/or the low molecular weight branched aliphatic alcohol used can be made.

In one embodiment of the present invention, it is preferred that the aliphatic alcohol be branched, where being branched means the presence of at least one branch (i.e., an oligomeric offshoot from a main chain) in the alkyl chain. While not wishing to be bound by theory, the presence of the branch in the alkyl chain is believed to lower the interaction of the nonionic surfactants with each other (e.g., preventing them from packing together) and thereby allowing stronger solvation of the surfactant by $CO_2$ molecules.

In one embodiment of the present invention, the alkoxylation reaction using the DMC catalyst provides the nonionic surfactant used in the present invention with a narrow polydispersity range. For the various embodiments, the nonionic surfactant used in the present invention can have a polydispersity of 1.01 to 1.10. The polydispersity can be determined by means of methods known to persons skilled in the art, for example by means of gel chromatography (size exclusion).

For the various embodiments, the nonionic surfactant of the present invention can have a cloud point in a range of the temperature of the subterranean formation to 30° C. above a temperature of the subterranean formation in which the foam is to be used. In some embodiments, selecting the nonionic surfactant of the present invention includes selecting the surfactant with a cloud point in a range of 10 to 20° C. above the temperature of the subterranean formation in which the foam is to be used.

The improvement of the present invention is a composition, and method of use thereof, that improves the surfactant partitioning between water and $CO_2$, preferably super critical $CO_2$, wherein the composition comprises a mixture of two nonionic surfactants. Specifically, the improvement is a mixture of at least two nonionic surfactants, a first surfactant and a second surfactant, made from alkoxylating $C_1$ to $C_{20}$, preferably $C_6$ to $C_9$ linear or branched alcohols, which may be the same or different, having varying degrees of propoxylation and ethoxylation wherein the degree of ethoxylation for the second surfactant is greater than the degree of ethoxylation for the first surfactant. Surprisingly, the mixture of two surfactants of the present invention demonstrates improved partitioning between the water and $CO_2$ than is predicted by the arithmetic mean of the individual surfactants alone.

One embodiment of the present invention is a mixture of nonionic surfactants, where each nonionic surfactant is prepared by an alkoxylation reaction with a double metal cyanide catalyst of a first epoxide, a second epoxide, and optionally a third epoxide wherein the first, second, and third epoxide are different from one another, and a linear or branched aliphatic alcohol having 6 to 9 carbon atoms.

Another embodiment of the present invention, is a mixture of nonionic surfactants comprising, consisting essentially of, or consisting of:

(A) a first nonionic surfactant, Surfactant 1, which is a block copolymer reaction product of an alphatic alcohol, $R_1OH$ with propylene oxide (PO), ethylene oxide (EO), and optionally butylene oxide (BO) represented by the following formula:

$$R_1-O-BO_x-PO_y-EO_z \qquad\qquad I$$

wherein $R_1$ is a linear or branched $C_1$ to $C_{20}$, preferably $C_7$ to $C_{20}$, more preferably $C_6$ to $C_9$, alkyl group, preferably n-hexyl, n-heptyl, n-octyl, n-nonyl, 2-ethyl hexyl, 4-methyl-2-pentyl, 2,4-dimethyl-3-pentyl, or 2,6-dimethyl-4-heptyl;

x is 0 to 5, preferably 1 to 3;

y is 0 to 10, preferably 2 to 10, more preferably 2 to 5; and z is 0 to 25, preferably 5 to 25, more preferably 7 to 15;

wherein the alphatic alcohol $R_1OH$ may be reacted with PO, EO, and optionally BO in any order, for example the reaction product may be: $R_1-BO_x-PO_y-EO_z$; $R_1-BO_x-EO_z-PO_y$; $R_1-EO_z-BO_x-PO_y$; $R_1-EO_z-PO_yBO_x$; $R_1-PO_y-EO_z-BO_x$; or $R_1-PO_yBO_x-EO_z$. and (B) a second nonionic surfactant, Surfactant 2, which is a block copolymer reaction product of an alphatic alcohol, $R_2OH$ with propylene oxide (PO), ethylene oxide (EO), and optionally butylene oxide (BO) represented by the following formula:

$$R_2-O-BO_l-PO_m-EO_n \qquad\qquad II$$

wherein $R_2$ may be the same or different than $R_1$ and is a linear or branched $C_1$ to $C_{20}$, preferably $C_5$ to $C_{20}$, more preferably $C_6$ to $C_9$, alkyl group, most preferably n-hexyl, n-heptyl, n-octyl, n-nonyl, 2-ethyl hexyl, 4-methyl-2-pentyl, 2,4-dimethyl-3-pentyl, or 2,6-dimethyl-4-heptyl;

l is 0 to 5, preferably 1 to 3;

m is 0 to 10, preferably 2 to 10, more preferably 2 to 5 and n is equal to or greater than z+4 and equal to or less than 50, preferably equal to or less than 30, wherein the alphatic alcohol $R_2OH$ may be reacted with PO, EO, and optionally BO in any order as described herein above for Surfactant 1.

In one embodiment of the present invention, for Surfactant 1, $R_1$ is 2,4-dimethyl-3-pentyl, x=0, y=2, and z=10 and for Surfactant 2, $R_2$ is 2-ethyl hexyl, l=0, m=5, and n=25.

In another embodiment of the present invention, for Surfactant 1, $R_1$ is n-hexyl, x=0, y=2, and z=10 and for Surfactant 2, $R_2$ is 2-ethyl hexyl, l=0, m=5, and n=25.

Preferably the first surfactant is present in the mixture of surfactants in an amount of equal to or greater than 30 weight percent, preferably equal to or greater than 35 weight percent, and more preferably equal to or greater than 40 weight percent, wherein weight percent is based on the combined weights of the first and second surfactants.

Preferably the first surfactant is present in the mixture of surfactants in an amount of equal to or less than 99 weight percent, preferably equal to or less than 85 weight percent, and more preferably equal to or less than 70 weight percent, wherein weight percent is based on the combined weights of the first and second surfactants.

Preferably the second surfactant is present in the mixture of surfactants in an amount of equal to or greater than 1 weight percent, preferably equal to or greater than 15 weight percent, and more preferably equal to or greater than 30 weight percent, wherein weight percent is based on the combined weights of the first and second surfactants.

Preferably the second surfactant is present in the mixture of surfactants in an amount of equal to or less than 70 weight percent, preferably equal to or less than 65 weight percent, and more preferably equal to or less than 60 weight percent, wherein weight percent is based on the combined weights of the first and second surfactants.

Embodiments of the present invention include a method for recovering crude oil from a subterranean formation penetrated by at least one injection well and one production well. For the various embodiments, the method includes providing two or more nonionic surfactants and injecting the two or more nonionic surfactants in the carbon dioxide into the subterranean formation via the injection well. For example, the diluent can be injected into the formation followed by injection of the nonionic surfactants with the carbon dioxide via the injection well to generate the foam. The two or more nonionic surfactants may be provided as a mixture or individually.

In an alternative example, it is also possible to inject the nonionic surfactants with the diluent, individually or as a mixture, into the subterranean formation via the injection well followed by injecting the carbon dioxide into the subterranean formation (i.e., the carbon dioxide is injected after the nonionic surfactants with the diluent is injected into the subterranean formation) to generate the foam. In addition, in some embodiments, the nonionic surfactants can be injected into the reservoir with both the diluent and carbon dioxide to generate the foam, where the nonionic surfactants can be included in either the carbon dioxide and/or the diluent, or one in the diluent and one on the carbon dioxide. The foam can also be created before being injected into the subterranean formation by stirring the diluent and the nonionic surfactants and injecting it into the subterranean reservoir. Other methods of forming foam within a subterranean formation are described in U.S. Pat. No. 4,380,266, which is incorporated herein by reference.

For the various embodiments, the mixture of nonionic surfactant, as described herein, can be included in an amount of at least 0.01 weight percent when dissolved directly in the carbon dioxide phase based on the weight of the carbon dioxide. In an additional embodiment, the mixture of nonionic surfactants of the present invention can be present in an amount of at least 0.05 weight percent when dissolved directly in the carbon dioxide phase based on the weight of the carbon dioxide. In another embodiment, the mixture of nonionic surfactants can be present in an amount of at least 0.5 weight percent when dissolved directly in the diluent phase based on the weight of the diluent. In an additional embodiment, the mixture of nonionic surfactants can be present in an amount of at least 1.0 weight percent when dissolved directly in the diluent phase based on the weight of the diluent. In addition, the mixture of nonionic surfactants can be included in the foam of the present invention in a range of 0.03 to 5.0 weight percent based on the total weight of the composition used to create the foam. In another embodiment, the mixture of nonionic surfactants can be included in the compositions of the present invention in a range of 0.05 to 2.0 weight percent based on the total weight of the composition used to create the foam. Other ranges are possible.

The carbon dioxide is a noncondensable gas (e.g., a gas that is not easily condensed by cooling) in the foam. As appreciated by one skilled in the art, for a given crude oil temperature, the noncondensable gas can become miscible with crude oil above a pressure known as the minimum miscibility pressure. Above this pressure, this "noncondensable" gas can attain a liquid phase or supercritical phase that has the characteristics of both gases and liquids. With enhanced recovery processes which employ noncondensable gases under miscible conditions the crude oil can be caused to flow toward a producing well because the noncondensable gas acts as a solvent, thus substantially dissolving, or "swelling" the crude oil (e.g., increases the volume of the crude oil by dissolving into the crude oil) to reduce the viscosity of the crude oil (e.g., provide a lowered viscosity of the crude oil). As used herein "dissolving" into the crude oil refers to the process where the carbon dioxide in the foam passes into solution with the crude oil. Since the carbon dioxide has a low viscosity relative to the crude oil, the viscosity of the crude oil will decrease as the carbon dioxide dissolves into the crude oil. In addition, viscosity is a measure of a fluid's resistance to flow. Therefore, by allowing the carbon dioxide in the foam to dissolve into the crude oil in the subterranean formation to provide a lowered viscosity of the crude oil, the crude oil will flow more readily than if the carbon dioxide had not dissolved into the crude oil. By reducing the viscosity, the crude oil can flow into a production well linked to the subterranean formation for recovery of the crude oil. In other words, the crude oil, having the lowered viscosity, can be recovered from the subterranean formation from the production well.

Although embodiments described herein include carbon dioxide as the noncondensable gas in compositions of the present invention, one skilled in the art will appreciate that other noncondensable gases may also be included in place of carbon dioxide and/or in addition to carbon dioxide. Examples of other possible noncondensable gases include, but are not limited to, nitrogen, natural gas, methane, propane, butane, ethane, ethylene, hydrogen sulfide, carbonyl sulfide, air, combustion flue gas, mixtures of methane with ethane, argon, light hydrocarbons, and mixtures thereof, among others.

The method for recovering crude oil from a subterranean formation can also include injecting a drive fluid into the subterranean formation after injection of the carbon dioxide and diluent to form the foam in the subterranean formation. As used herein, the term "drive fluid" can include a liquid, a gas, a dispersion or a mixture thereof, which is used in enhanced crude oil recovery. Examples of a drive fluid can include, but are not limited to, water, brine, an aqueous solution containing a polymer, a dispersion, a foam, an emulsion and mixtures thereof. Additional examples of the drive fluid can include a gas or a vapor selected from carbon dioxide, $H_2S$, steam, a hydrocarbon-containing gas, an inert gas, air, oxygen and mixtures thereof. Further it is understood that the surfactant can be injected intermittently or using gradients in concentration, which may help to lower the effective cost of the application.

In some embodiments, compositions of the present invention can include other additives. For example, the composition can include corrosion inhibitors, antioxidants, co-surfactants, scale inhibitors, mixtures thereof, as well as other additives. In some embodiments, the total amount of the additives added to the compositions of the present invention is not greater than about 5 weight percent, based on a total weight of the composition.

In addition to being used in enhanced crude oil recovery, the nonionic surfactants of the present invention may also be used in a variety of other areas where it would be desirable to use carbon dioxide as a solvent in a foam or an emulsion. Such areas include, but are not limited to, dry cleaning applications and industrial catalysis. In dry cleaning applications, the nonionic surfactant can help form an emulsion of water and supercritical carbon dioxide, which can act as a cleaning solvent. In industrial catalysis, an emulsion or a foam of the nonionic surfactant, supercritical carbon dioxide and a diluent may act as a solvent for the catalyst system, which normally would have required an organic solvent.

It is to be understood that the above description has been made in an illustrative fashion, and not a restrictive one. Although specific embodiments have been illustrated and described herein, those of ordinary skill in the art will appreciate that other component arrangements can be substituted for the specific embodiments shown. The claims are intended to cover such adaptations or variations of various embodiments of the disclosure, except to the extent limited by the prior art.

In the foregoing Detailed Description, various features are grouped together in exemplary embodiments for the purpose of streamlining the disclosure. This method of disclosure is not to be interpreted as reflecting an intention that any claim requires more features than are expressly recited in the claim. Rather, as the following claims reflect, inventive subject matter lies in less than all features of a single disclosed embodiment. Thus, the following claims are hereby incorporated into the Detailed Description, with each claim standing on its own as a separate embodiment of the disclosure.

Embodiments of the present invention are illustrated by the following examples. It is to be understood that the particular examples, materials, amounts, and procedures are to be interpreted broadly in accordance with the scope and spirit of the disclosure as set forth herein.

EXAMPLES

The following examples are given to illustrate, but not limit, the scope of this disclosure. Unless otherwise specified, all instruments and chemicals used are commercially available.

Synthesis of Examples 1 to 4

The following procedure is used to synthesize Examples 1 to 4. The DMC-catalyzed alkoxylation reactions described below are performed in a jacketed, baffled 9 L stainless steel autoclave reactor equipped with a magnetically driven impeller, pressure transducer, redundant reactor thermocouples, and jacket return line thermocouple. Temperature control is achieved with a mixture of steam and cooling water to the reactor jacket introduced via reciprocating control valves operated by a MOD-V digital control system. Oxide charge is accomplished by introducing the target quantity alkylene oxide into a designated feed tank situated on a scale. Oxide is then metered from the feed tank bottom outlet to the reactor through an automated flow control valve within the operating temperature (±5° C. of set point) and pressure (16 to 85 psia) constraints. The DMC catalyst is available as ARCOL™ A3 from Bayer Material Science.

Example 1

A slurry of 1-hexanol (399.7 g) and DMC catalyst (0.65 g) is charged to a 9 L reactor. The reactor is pressurized with nitrogen then vented (7 times) to remove atmospheric oxygen. Subsequently, the reactor is pressurized with nitrogen to 16 to 20 psia at ambient temperature. The reactor contents are heated with agitation at 130° C., then PO (455 g total) is metered into the reactor over 2 hours at 130° C. Initially, there is a pressure increase until the DMC catalyst activated. Reaction pressure at the end of the PO feed is 25-30 psia. After the PO feed is complete, the reactor contents are agitated at 130° C. for an additional 1.5 hours to consume unreacted oxide (digest). The reactor is cooled to approximately 60° C. A portion of the reactor contents is sampled (323.6 g) and analyzed for hydroxyl content (7.749% OH corresponding to 218 MW). The remaining reactor contents (531.7 g) are heated with agitation to 130° C., then EO (1075 g total) is metered into the reactor over 5 hours at 130° C. After the EO feed is complete, the reactor contents are agitated for an additional 2 hours to consume unreacted oxide (digest). The reactor is cooled to approximately 60° C. A portion of the reactor contents is sampled (724.4 g) and analyzed for hydroxyl content (2.646% OH corresponding to 642 MW).

Example 2

A slurry of 4-methyl-2-pentanol (397.8 g) and DMC catalyst (0.64 g) is charged to a 9 L reactor. The reactor is pressurized with nitrogen then vented (7 times) to remove atmospheric oxygen. Subsequently, the reactor is pressurized with nitrogen to 16 to 20 psia at ambient temperature. The reactor contents are heated with agitation at 130° C., then PO (455 g total) is metered into the reactor over 2 hours at 130° C. Initially, there is a pressure increase until the DMC catalyst activated. Reaction pressure at the end of the PO feed is 25 to 30 psia. After the PO feed is complete, the reactor contents are agitated at 130° C. for an additional 1.5 hours to consume unreacted oxide (digest). The reactor is cooled to approximately 60° C. A portion of the reactor contents is sampled (92.0 g) and analyzed for hydroxyl content (7.905% OH corresponding to 215 MW). The remaining reactor contents (761.4 g) are heated with agitation to 130° C., then EO (1560 g total) is metered into the reactor over 5 hours at 130° C. After the EO feed is complete, the reactor contents are agitated for an additional 2 hours to consume unreacted oxide (digest). The reactor is cooled to approximately 60° C. A portion of the reactor contents is sampled (742.0 g) and analyzed for hydroxyl content (2.608% OH corresponding to 652 MW).

Example 3

A slurry of 2,6-dimethyl-4-heptanol (500.0 g) and DMC catalyst (0.63 g) is charged to a 9 L reactor. The reactor is pressurized with nitrogen then vented (7 times) to remove atmospheric oxygen. Subsequently, the reactor is pressurized with nitrogen to 16 to 20 psia at ambient temperature. The reactor contents are heated with agitation at 130° C., then PO (405 g total) is metered into the reactor over 2 hours at 130° C. Initially, there is a pressure increase until the DMC catalyst activated. Reaction pressure at the end of the PO feed is 25-30 psia. After the PO feed is complete, the reactor contents are agitated at 130° C. for an additional 1.5 hours to consume unreacted oxide (digest). The reactor is cooled to approximately 60° C. A portion of the reactor contents is sampled (358.1 g) and analyzed for hydroxyl content (6.234% OH corresponding to 273 MW). The remaining reactor contents (547.5 g) are heated with agitation to 130° C., then EO (900 g total) is metered into the reactor over 5 hours at 130° C. After the EO feed is complete, the reactor contents are agitated for an additional 2 hours to consume unreacted oxide (digest). The reactor is cooled to approximately 60° C. A portion of the reactor contents is sampled (700.8 g) and analyzed for hydroxyl content (2.434% OH corresponding to 698 MW).

Example 4

A slurry of 1-nonanol (492.0 g) and DMC catalyst (0.63 g) is charged to a 9 L reactor. The reactor is pressurized with nitrogen then vented (7 times) to remove atmospheric oxygen. Subsequently, the reactor is pressurized with nitrogen to 16 to 20 psia at ambient temperature. The reactor contents are heated with agitation at 130° C., then PO (405 g total) is metered into the reactor over 2 hours at 130° C. Initially, there is a pressure increase until the DMC catalyst activated. Reaction pressure at the end of the PO feed is 25-30 psia. After the PO feed is complete, the reactor contents are agitated at 130° C. for an additional 1.5 hours to consume unreacted oxide (digest). The reactor is cooled to approximately 60° C. A portion of the reactor contents is sampled (257.2 g) and analyzed for hydroxyl content (6.752% OH corresponding to 252 MW). The remaining reactor contents (640.4 g) are heated with agitation to 130° C., then EO (1150 g total) is metered into the reactor over 5 hours at 130° C. After the EO feed is complete, the reactor contents are agitated for an additional 2 hours to consume unreacted oxide (digest). The reactor is cooled to approximately 60° C. A portion of the reactor contents is sampled (706.7 g) and analyzed for hydroxyl content (2.444% OH corresponding to 696 MW).

Synthesis of Examples 5 and 6

The following procedure is used to synthesize Examples 5 and 6. The DMC-catalyzed alkoxylation reactions are performed in a baffled 600 mL stainless steel autoclave reactor equipped with a heating block, magnetically driven impeller, pressure transducer, and redundant reactor thermocouples. Temperature control is achieved by modulating the heating block temperature with cooling water operated by the digital control system. Oxide charge is accomplished by introducing the target quantity alkylene oxide into a designated feed tank situated on a scale. Oxide is then metered from the feed tank bottom outlet to the reactor through an automated mass flow control valve within the operating temperature (±5° C. of set point) and pressure (16 to 85 psia) constraints. The DMC catalyst is available as ARCOL A3 from Bayer Material Science.

Example 5

A slurry of 2,4-dimethyl-3-pentanol (75 g) and DMC catalyst (0.072 g) is charged to a 600 mL reactor. The reactor is pressurized with nitrogen and vented (8 times) to remove atmospheric oxygen. After the third nitrogen pad, started agitator at 400 RPM and increased agitation to 600 RPM after the sixth nitrogen pad. Started pressure test after the eighth nitrogen pad and also increased agitation to 800 RPM. At the start of the run feed, 7.4 g of PO is charged to the reactor, which caused DMC activation, reactor pressure to decrease, and an exotherm is observed. Feed is restarted at 130° C. DMC catalyst activated and the remaining PO is fed and digested. A total of 75.1 g of PO is introduced the reactor. PO run is fed out and digested at 130° C. For the EO feed, fed 1.5 g of EO at 130° C. to activate the DMC catalyst, which caused the reactor pressure to drop, and an exotherm is observed. Restarted at 130° C. A total of 285 g of EO is fed to the reactor at 130° C. After digest at 130° C., a portion of the reactor contents are sampled and analyzed for hydroxyl content (2.388% OH corresponding to 712 MW).

Example 6

A slurry of 2-ethylhexanol (35 g) and DMC catalyst (0.031 g) is charged to a 600 mL reactor. The reactor is pressurized with nitrogen and vented (7 cycles) to remove atmospheric oxygen. After the second nitrogen pad, started agitator at 200 RPM and increased agitation to 600 RPM after the sixth nitrogen pad. Started pressure test after the seventh nitrogen pad and also increased agitation to 800 RPM. At the start of the run feed, 3.0 g of PO is charged to the reactor, which caused DMC activation, reactor pressure to decrease, and an exotherm is observed. The remaining PO is fed and digested at 130° C. A total of 78.2 g of PO is introduced the reactor. PO run is fed out and digested at 130° C. For the EO feed, introduced 2.3 g of EO at 130° C. and observed a pressure drop in the reactor indicating DMC activation. Once the feed temperature stabilized, restarted the EO feed. A total of 312.6 g of EO is fed to the reactor at 130° C. After digest at 130° C., a portion of the reactor contents are sampled and analyzed for hydroxyl content (1.160% OH corresponding to 1466 MW).

Surfactant Partitioning in $CO_2$.

In Examples 7 to 17:

Surfactant 1 (one of Example 1 to 5) is represented by the following formula:

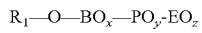

$R_1$—O—$BO_x$—$PO_y$-$EO_z$ wherein $R_1$, x, y, and z are listed in Table 1.

TABLE 1

| | Example | | | | |
|---|---|---|---|---|---|
| | 1 | 2 | 3 | 4 | 5 |
| $R_1$ | n-hexyl | 4-methyl-2-pentyl | 2,4-dimethyl-3-pentyl | n-nonyl | 2,6-dimethyl-4-heptyl |
| x | 0 | 0 | 0 | 0 | 0 |
| y | 2 | 2 | 2 | 2 | 2 |
| z | 10 | 10 | 10 | 10 | 10 |

Surfactant 2 (Example 6) is represented by the following formula:

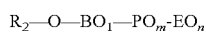

$R_2$—O—$BO_1$—$PO_m$-$EO_n$ wherein $R_2$ is 2-ethyl hexyl; 1 is 0; m is 5; and n is 25.

In Examples 7 to 17, Surfactant 1 and/or Surfactant 2 individually or as mixtures are loaded into a 1 L vessel as a water solution at a concentration of approximately 4,000 ppm; for blends the ratio is 1:1 by mass. The final concentration of surfactant or surfactant blends of approximately 2000 ppm is achieved by diluting in half with an equal volume of $CO_2$ at a pressure of 2000 psi and a temperature of 40° C. The mixture is allowed to equilibrate for 24 hours and then two aliquots of approximately 30 mL of the aqueous phase are sampled. Compositions of Examples 7 to 17 are shown in Table 2.

TABLE 2

| | Surfactant 1 | | | | | Surfactant 2 |
|---|---|---|---|---|---|---|
| Example | Ex 1 | Ex 2 | Ex 3 | Ex 4 | Ex 5 | Ex 6 |
| 7 | | | | | | 100 |
| 8 | 100 | | | | | |
| 9 | | 100 | | | | |
| 10 | | | 100 | | | |
| 11 | | | | 100 | | |
| 12 | | | | | 100 | |
| 13 | 50 | | | | | 50 |
| 14 | | 50 | | | | 50 |
| 15 | | | 50 | | | 50 |
| 16 | | | | 50 | | 50 |
| 17 | | | | | 50 | 50 |

The concentration of the surfactant when a single surfactant is used and of each surfactant type individually when a blend is evaluated are quantified by liquid chromatography calibrated with standards of each component with known concentration. These data are then used to calculate the fraction of the surfactant in the $CO_2$ phase in the data presented below in Table 3. The data are reported as the mean of Surfactant 1 and Surfactant 2 fractions in the $CO_2$ phase±standard error. Standard error is from pooled variance of duplicate measurements on each unique composition.

TABLE 3

| Example | Actual | Predicted 1:1 Blend | Surfactant 1 Fraction | Surfactant 2 Fraction |
|---|---|---|---|---|
| 7 | 0.001 ± 0.021 | | | |
| 8 | 0.084 ± 0.021 | | | |
| 9 | 0.15 ± 0.021 | | | |
| 10 | 0.19 ± 0.021 | | | |
| 11 | 0.22 ± 0.021 | | | |
| 12 | 0.38 ± 0.021 | | | |
| 13 | 0.092 ± 0.021 | 0.042 ± 0.021 | 0.15 ± 0.021 | 0.034 ± 0.021 |
| 14 | 0.074 ± 0.021 | 0.075 ± 0.021 | 0.12 ± 0.021 | 0.04 ± 0.021 |
| 15 | 0.028 ± 0.021 | 0.096 ± 0.021 | 0.028 ± 0.021 | 0.028 ± 0.021 |
| 16 | 0.17 ± 0.021 | 0.11 ± 0.021 | 0.24 ± 0.021 | 0.11 ± 0.021 |
| 17 | 0.38 ± 0.021 | 0.19 ± 0.021 | 0.43 ± 0.021 | 0.32 ± 0.021 |

As can be seen, the concentration of Surfactant 2 in $CO_2$ in each of the blends of the present invention (Examples 13 to 17) is higher than for pure Surfactant 2 (Example 7).

The overall surfactant concentration for the blends of the invention (Examples 13 to 17) are higher than predicted by the individual components.

The data shows that for the blends of the invention where the extent of ethyoxylation for Surfactant 2 is higher than for Surfactant 1 there is improved partitioning, i.e., increased concentration in the $CO_2$ phase, behavior of Surfactant 1 in the blends (Examples 13 and 17) versus Surfactant 1 alone (Examples 8 and 12).

What is claimed is:

1. A method for recovering crude oil from a subterranean formation that is penetrated by at least one injection well and one production well, comprising the steps of:
   (i) injecting a mixture of two or more nonionic surfactants in carbon dioxide into the subterranean formation, where each nonionic surfactant is independently prepared by an alkoxylation reaction with a double metal cyanide catalyst of a first epoxide, a second epoxide, and optionally a third epoxide wherein the first, second, and third epoxide are different from one another, and a linear or branched aliphatic alcohol having 1 to 20 carbon atoms, the mixture of two or more nonionic surfactants comprising:

(A) a first nonionic surfactant which is a block copolymer reaction product of an aliphatic alcohol $R_1OH$, with propylene oxide (PO), ethylene oxide (EO), and optionally butylene oxide (BO) represented by the following formula:

$$R_1\text{—}O\text{—}BO_x\text{—}PO_y\text{-}EO_z \qquad (I)$$

wherein $R_1$ is a linear or branched $C_1$ to $C_{20}$ alkyl group;
x is 0 to 5;
y is 0 to 10;
and
z is 0 to 25;
wherein the aliphatic alcohol $R_1OH$ may be reacted with PO, EO, and optionally BO in any order
and (B) a second nonionic surfactant which is a block copolymer reaction product of an aliphatic alcohol $R_2OH$ with propylene oxide (PO), ethylene oxide (EO), and optionally butylene oxide (BO) represented by the following formula:

$$R_2\text{—}O\text{—}BO_l\text{—}PO_m\text{-}EO_n \qquad (II)$$

wherein $R_2$ may be the same or different than $R_1$ and is a linear or branched $C_1$ to $C_{20}$ alkyl group;
l is 0 to 5;
m is 0 to 10
and
n is equal to or greater than z+4 and equal to or less than 50,
wherein the aliphatic alcohol $R_2OH$ may be reacted with PO, EO, and optionally BO in any order;
and (ii) recovering crude oil from the subterranean formation from a production well.

2. The method of claim 1 where injecting the mixture of nonionic surfactants further includes the steps of:
(i)(a) creating a foam with the nonionic surfactants in carbon dioxide and a diluent and
(i)(b) injecting the foam of the nonionic surfactants in carbon dioxide and the diluent into the subterranean formation.

3. The method of claim 1, where each nonionic surfactant independently has a polydispersity of 1.01 to 1.10.

4. The method of claim 1, where each linear or branched aliphatic alcohol independently has 6 to 9 carbon atoms.

5. An emulsion, comprising:
carbon dioxide;
a diluent; and
a mixture of two or more nonionic surfactants where each nonionic surfactant is independently prepared by an alkoxylation reaction with a double metal cyanide catalyst of a first epoxide, a second epoxide, and optionally a third epoxide wherein the first, second, and third epoxide are different from one another, and a linear or branched aliphatic alcohol having 6 to 9 carbon atoms, the mixture of two or more nonionic surfactants comprising:

(A) a first nonionic surfactant which is a block copolymer reaction product of an aliphatic alcohol $R_1OH$, with propylene oxide (PO), ethylene oxide (EO), and optionally butylene oxide (BO) represented by the following formula:

$$R_1\text{—}O\text{—}BO_x\text{—}PO_y\text{-}EO_z \qquad (I)$$

wherein $R_1$ is a linear or branched $C_6$ to $C_9$ alkyl group;
x is 0 to 5;
y is 0 to 10;
and
z is 0 to 25;
wherein the aliphatic alcohol $R_1OH$ may be reacted with PO, EO, and optionally BO in any order
and (B) a second nonionic surfactant which is a block copolymer reaction product of an aliphatic alcohol $R_2OH$ with propylene oxide (PO), ethylene oxide (EO), and optionally butylene oxide (BO) represented by the following formula:

$$R_2\text{—}O\text{—}BO_l\text{—}PO_m\text{-}EO_n \qquad (II)$$

wherein $R_2$ may be the same or different than $R_1$ and is a linear or branched $C_6$ to $C_9$ alkyl group;
l is 0 to 5;
m is 0 to 10
and
n is equal to or greater than z+4 and equal to or less than 50,
wherein the aliphatic alcohol $R_2OH$ may be reacted with PO, EO, and optionally BO in any order.

6. The emulsion of claim 5, where each nonionic surfactant independently has a polydispersity of 1.01 to 1.10.

* * * * *